(12) United States Patent
Kazmi

(10) Patent No.: US 8,731,548 B2
(45) Date of Patent: May 20, 2014

(54) METHOD AND ARRANGEMENT FOR EVENT TRIGGERED ADAPTIVE CELL DETECTION ACTIVITY LEVEL IN DISCONTINUOUS RECEPTION

(75) Inventor: Muhammad Ali Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 853 days.

(21) Appl. No.: 12/681,837

(22) PCT Filed: May 19, 2008

(86) PCT No.: PCT/EP2008/003999
§ 371 (c)(1),
(2), (4) Date: Apr. 6, 2010

(87) PCT Pub. No.: WO2009/046776
PCT Pub. Date: Apr. 16, 2009

(65) Prior Publication Data
US 2010/0216455 A1    Aug. 26, 2010

Related U.S. Application Data

(60) Provisional application No. 60/978,220, filed on Oct. 8, 2007.

(51) Int. Cl.
*H04W 4/00* (2009.01)
(52) U.S. Cl.
USPC .......... 455/434; 455/423; 455/424; 455/436; 455/437
(58) Field of Classification Search
USPC .................. 455/423, 424, 434, 436–444
See application file for complete search history.

(56) References Cited

U.S. PATENT DOCUMENTS 6,349,207 B1 * 2/2002 Monot et al. .................. 455/423
7,126,930 B2    10/2006 Pankaj et al.
2004/0005890 A1 * 1/2004 Holma et al. .................. 455/424

(Continued)

FOREIGN PATENT DOCUMENTS

CN    1345519 A    4/2002
EP    1152624 A1    11/2001

(Continued)

OTHER PUBLICATIONS

Mouly, M et al. "THe GSM System for Mobile Communications Passage." GSM System for Mobile Communications, Jan. 1, 1992, pp. 446-459.

*Primary Examiner* — Charles Appiah
*Assistant Examiner* — Jaime Holliday
(74) *Attorney, Agent, or Firm* — Coats and Bennett PLLC

(57) ABSTRACT

In a cellular communication network, a user equipment can adapt the intensity (or measurement activity) with which it attempts to identify a new neighbor cell, based on a comparison of the quality of the already identified neighbor cells with the quality of a reference cell. This intensity is lower provided that the downlink received signal level (e.g. in terms of CPICH Ec/No or/and SCH Ec/No) from an appropriate selection of neighbor cells (cells belonging to active or candidate set) is not weaker than the reference (e.g. serving) cell by a certain threshold. On the other hand the UE shall identify a new cell with higher intensity provided the downlink received signal level (e.g. in terms of CPICH Ec/No or/and SCH Ec/No) from said selection of neighbor cells is weaker than the reference cell by a certain threshold.

32 Claims, 2 Drawing Sheets

(56) References Cited

U.S. PATENT DOCUMENTS

| | | | |
|---|---|---|---|
| 2004/0082328 A1* | 4/2004 | Japenga et al. | 455/436 |
| 2005/0107110 A1* | 5/2005 | Vasudevan et al. | 455/525 |
| 2008/0004023 A1* | 1/2008 | Chen et al. | 455/436 |
| 2008/0220784 A1* | 9/2008 | Somasundaram et al. | 455/437 |

FOREIGN PATENT DOCUMENTS

| | | |
|---|---|---|
| EP | 1424862 A1 | 6/2004 |
| RU | 2003127411 A | 4/2005 |
| RU | 2280328 C2 | 7/2006 |
| WO | 2009030289 A1 | 3/2009 |

\* cited by examiner

METHOD AND ARRANGEMENT FOR EVENT TRIGGERED ADAPTIVE CELL DETECTION ACTIVITY LEVEL IN DISCONTINUOUS RECEPTION

FIELD OF THE INVENTION

The present invention relates to methods and arrangements in a mobile communication system, in particular to neighbour cell identification activities.

BACKGROUND

In Wideband Code Division Multiple Access (WCDMA) networks and Evolved Universal Terrestrial Radio Access Networks (E-UTRAN) the mobility decisions, which include cell reselection and handover heavily rely on cell search of new cells and subsequently the downlink measurements of these identified cells performed by the UE. Therefore, in order to ensure good UE mobility performance the UE should be able to measure and keep track of certain number of best cells in terms of downlink measured quality.

In WCDMA in active mode the UE is required to detect (or identify) a new intra-frequency cell in at least 800 ms. In addition it should be able to measure and report the downlink quality (i.e. CPICH measurements) of at least 8 cells (one serving and seven neighbor cells), while fulfilling the minimum performance requirements as specified in TS 25.133[1].

In E-UTRAN the measurement performance requirements along the lines similar to those used in WCDMA are likely to be specified [2].

Mobility Scenarios

There are basically two kinds of mobility scenarios:
Idle mode mobility: cell reselection
Connected mode mobility: handover The cell reselection is mainly UE autonomous function without the intervention of its serving cell. But to some extent the UE behavior in this mobility scenario could still be controlled by some broadcasted system parameters and performance specification.

The handover on the other hand is fully controlled by the network through explicit UE specific commands and by performance specification.

In both idle and connected modes the mobility decisions are mainly based on the same kind of downlink measurements as will be discussed in more details in relation to the description of the problem.

Both WCDMA and E-UTRAN are frequency reuse-1 systems. This means the geographically closest neighbor cells operate on the same carrier frequency. An operator may also deploy multiple frequency layers within the same coverage area. Therefore, idle mode and connected mode mobility in both WCDMA and E-UTRAN could be broadly classified into three main categories:

Intra-frequency mobility (idle and connected modes) where the UE moves between the cells belonging to the same carrier frequency. This is the most important mobility scenario since it involves less cost in terms of delay due. In addition an operator would have at least one carrier at its disposal that it would like it to be efficiently utilized. Inter-frequency mobility (idle and connected modes) is the scenario where the UE moves between cells belonging to different carrier frequencies but of the same access technology. This could be considered as the second most important scenario. Inter-RAT mobility (idle and connected modes) is the scenario where the UE moves between cells that belong to different access technologies such as between WCDMA and GSM or vice versa.

UE Measurement Aspects Related to Mobility

In order to guarantee good mobility performance in WCDMA or in E-UTRAN UE performs two major tasks:

Identification of new cells, i.e. to fully synchronize and identify an unknown cell Regularly measure and report the downlink measurements on some plot or reference signal channels from certain minimum number of identified cells, e.g. CPICH Ec/No and RSCP in WCDMA [3] and RSRP and RSRQ in E-UTRAN.

In order to ensure good mobility performance the requirements related to the above measurement tasks are specified. In WCDMA the specification covers the following is specified to ensure that UE meets at least these requirements. Some of these important requirements in active mode include [1]:

Identification delay of unknown cells for the given received level of the corresponding synchronization and CPICH signals. The max delay is up to 800 ms for intra-frequency cells in continuous reception mode (i.e. without DRX).

Minimum number of identified cells (8 including one serving and 7 neighbor cells) for which UE is supposed to report the CPICH measurements with the specified measurement absolute and relative accuracies The measurement period of 200 ms over which the specified measurement accuracies of at least 8 cells are fulfilled Similar requirements will be specified for E-UTRAN.

Cell Identification Process in UE

In order to report the downlink measurements of the requirement number of identified cells to the network, the UE needs to regularly look (i.e. identify) for new cells that have become better than the current or old cells. The terms cell detection, cell search and cell identification have the same meaning, which is the UE ability to fully synchronize (i.e. finding cell timing, cell identity etc) to previously unknown cell. The cell to be identified may or may not belong to the neighbor cell list provided by the network to the UE.

Thus to fulfill the standardized minimum requirements and due to the varying radio conditions the UE needs to identify and measure the neighbor cells on regular basis. The scheduling of such measurement process is not standardized but is rather UE implementation specific. To limit hardware cost and to prevent battery exhaustion the UE would typically collect measurement samples for different type of measurements at some periodic intervals.

In idle mode the UE does measurement mainly at the paging occasions (i.e. at the wake instances at the end of DRX cycle). Therefore, measurement sampling rate in idle mode is considerably low compared to the connected mode scenario. Due to this reason measurement performance in idle mode becomes much coarser than that would be achievable in connected mode.

Impact of Discontinuous Reception (DRX) in Active Mode on Cell Identification

In WCDMA release 7 a new feature called discontinuous reception (DRX) in connected mode (more specifically in CELL_DCH state) has been specified [5]. This allows UE to save its battery while stay connected since it wakes up only at periodic instances according to the DRX cycle. In release 7 the maximum DRX cycle is 40 ms.

In general the DRX feature also implies that UE will mainly collect the measurement samples at the wake up instances or at least less frequently compared to the continuous reception case. Accordingly the measurement requirements have been relaxed in DRX mode in release 7 [1]. The worst case intra-frequency cell identification in DRX (release 7) may take up to 6 seconds, i.e. if we assume 40 ms DRX and 5% UE activity level [1]. Therefore, DRX in active mode may have some adverse effect on the mobility performance in general and cell identification performance in particular. However, the delay of 6 seconds is still within an acceptable limit for packet data services, which are more delay tolerant. It has been shown that this will affect only up to 10% of the users. This is because in most cases the active set update, where one or more old cells are replaced by the newly identified ones, takes longer than 6 seconds. However, for real time services, even better performance is desirable.

Introduction of new services and future enhancements in WCDMA will likely require more DRX options. However, the current requirements, which are based on state of the art principles, would be inadequate to meet the mobility performance target (i.e. reduce call dropping rate).

In E-UTRAN the active mode DRX may allow network to use up to 2.56 seconds of DRX cycle. Thus there is risk that if current methodology is used the cell identification may also become unnecessarily longer.

Problems with Existing Solutions

Cell Identification in DRX Scenario

In DRX mode if UE identifies a new cell only during the active times then obviously the delay will be longer especially if the target cell is weak in terms of its reception quality, e.g. CPICH Ec/No and/or SCH Ec/No.

On the other hand if all the time in DRX mode the UE is forced to provide the same cell identification performance as achieved in continuous reception mode would drain UE battery. Thus there will be no use of having a DRX feature.

Poor measurement performance and especially longer cell identification delay would delay the active set update. This in turn would also delay handover decisions at the base station, which relies on UE measurement reports for executing handover. Therefore, in active mode the performance degradation of these measurements should be minimized to prevent unnecessary call dropping.

Several state of the art solutions exist or are proposed so as to minimize the performance degradation of cell identification in active mode DRX scenario, of which a few is presented in the following:

Identify Cells with Higher SCH and CPICH Received Levels

The currently agreed solution is that UE in DRX performs measurement and identify cells provided that the minimum received level on synchronization channel (SCH) and common pilot channel (CPICH) on that cell is significantly higher (e.g. 3 dB higher than in case of non DRX). Since cells are relatively stronger therefore on the average the cell identification will be relatively faster.

Absolute Thresholds Based Cell Identification Delay Adjustment

The network provides UE with absolute thresholds in terms of CPICH Ec/Io or CPICH RSCP levels and some measurement activity factor. The latter parameter is used to scale the measurement activity (e.g. cell identification time, measurement period) depending upon the CPICH Ec/Io and/or CPICH RSCP reception level of the strongest monitored cell in the active set.

As long as the received CPICH Ec/No and/or CPICH RSCP from the serving cell are above these signalled thresholds, the UE has to identify a new intra-frequency cell according to the measurement activity factor. Generally this would lead to longer cell identification delay depending upon the signaled activity factor. On the other hand when this condition is no longer met, i.e. if the serving cell quality is weak (below Ec/No or/and RSCP thresholds) then the UE will identify a new cell with the same delay as specified for continuous reception case, i.e. 800 ms worst case delay [1].

One drawback is that UE will have to measure more often even if it is not needed for instance there may still be relatively good cells in the active set. Thus in reality UE will have to wake up during the inactive time of the DRX length. This will drain UE battery thereby defying the benefits of DRX operation.

Switch to Continuous Mode (Non DRX) in Cell Border Region

The WCDMA specification [5] allows network in active mode to promptly direct the UE to switch between DRX and non DRX modes through low level signaling. Thus, one possible solution to speed up the measurement process is to revert to non DRX mode (or very short DRX cycle) when UE enters in cell border region. The network can determine whether UE lies in cell border region or not by comparing the UE reported downlink channel quality (e.g. CPICH level) with a certain threshold. Typically between 25-35% users operate in the cell border region. Thus with approach on the average between 65-75% of the time the UE could barely stay in DRX. Since UE cannot fully utilize DRX, this approach is not desirable from UE battery saving perspective.

SUMMARY

The main limitation of the described prior art solutions is that these solutions do not consider the relative performance difference between the serving and the target/neighbour cells. This difference plays an important role in mobility performance and especially the frequency of new cell identification.

The present invention aims to provide a method that takes into account the relative performance difference between the serving and the target/neighbour cells.

Generally, the UE shall identify a new cell with relatively lower intensity (or measurement activity) provided that the downlink received signal level (e.g. in terms of CPICH Ec/No or/and SCH Ec/No) from an appropriate selection of neighbour cells (cells belonging to active or candidate set) is not weaker than the serving cell by a certain threshold. On the other hand the UE shall identify a new cell with higher intensity provided the downlink received signal level (e.g. in terms of CPICH Ec/No or/and SCH Ec/No) from said selection of neighbour cells is weaker than the serving cell by a certain threshold.

In one embodiment of the present invention, the UE shall identify a new cell with relatively lower intensity (or measurement activity) provided that the downlink received signal level (e.g. in terms of CPICH Ec/No or/and SCH Ec/No) from at least N strongest neighbor (cells belonging to active or candidate set) cells is not weaker than the serving cell by a certain threshold. On the other hand the UE shall identify a new cell with higher intensity provided the downlink received signal level (e.g. in terms of CPICH Ec/No or/and SCH Ec/No) from at least N strongest neighbor (or target or cells belonging to active or candidate set) cells is weaker than the serving cell by a certain threshold.

In another embodiment the UE shall identify a new cell with relatively lower intensity (or measurement activity) provided the downlink received signal level (e.g. in terms of CPICH Ec/No or/and SCH Ec/No) from the weakest neighbor cell in the active or candidate set is not weaker than the serving cell by a certain threshold. On the other hand the UE shall identify a new cell with higher intensity provided the downlink received signal level (e.g. in terms of CPICH Ec/No or/and SCH Ec/No) from the weakest cell belonging to active or candidate set is weaker than the serving cell by a certain threshold.

The serving cell may not be the strongest. Therefore in yet another set of embodiments the cell identification or detection performance would depend upon the relative difference in the received levels (e.g. in terms of CPICH Ec/No and/or SCH Ec/No) between the strongest and the N strongest target or neighbor cells.

DETAILED DESCRIPTION

Figure 1:
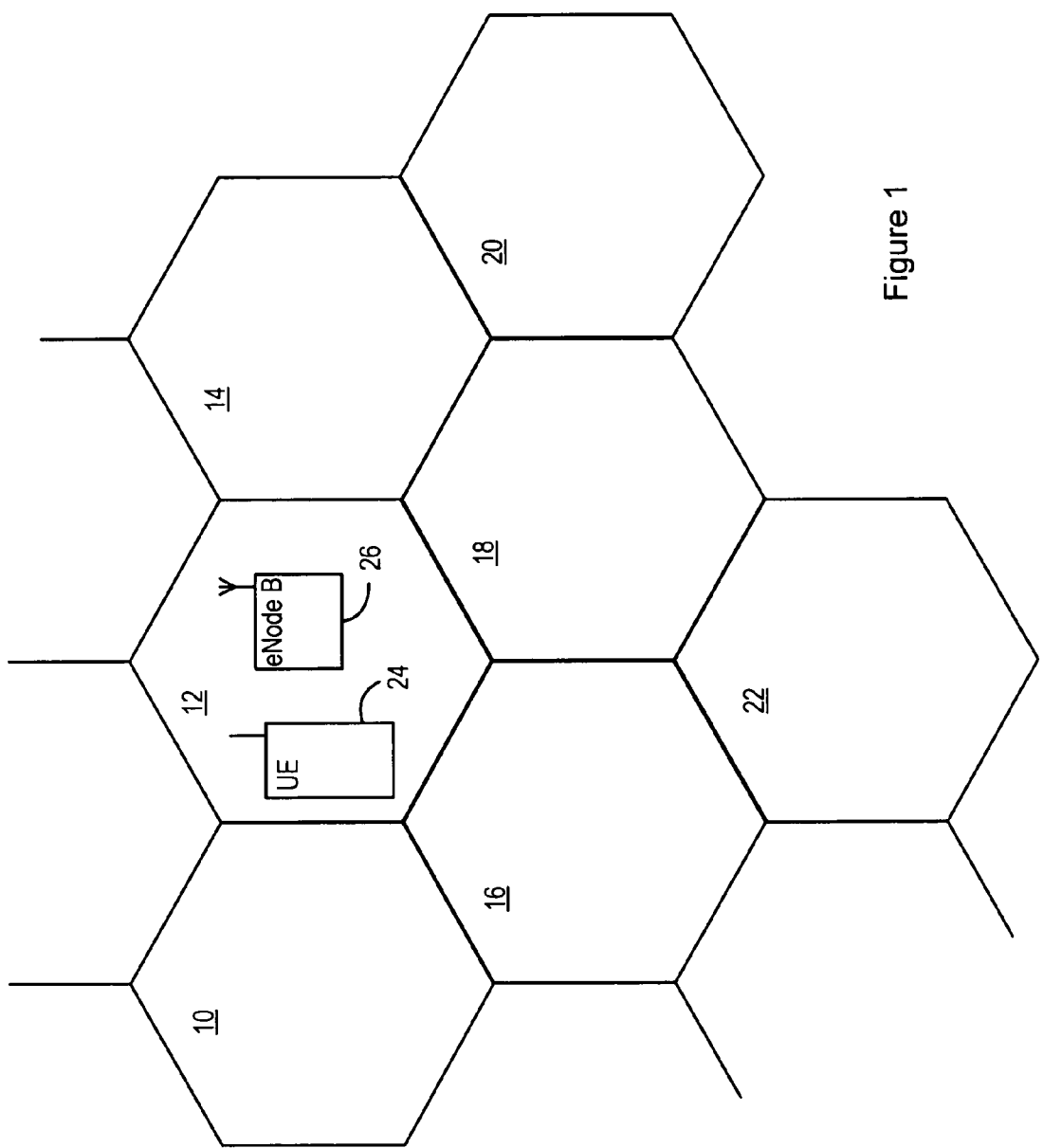
FIG. 1 illustrates a cellular communication network in accordance with the present invention.

FIG. 1 illustrates schematically a cellular communications network operating in accordance with the invention.

The network coverage area is divided into cells 10, 12, 14, 16, 18, 20, 22, etc. A user equipment (UE) 24 is located in the cell 12, and is in communication with a base station (eNode B) 26 in that cell, which is therefore the serving cell for that UE. As is well known, the UE must make measurements on the signals received from other cells, in order to identify potential neighbour cells. The invention will be described herein primarily with reference to a Long term evolution (E-UTRAN) network, but it will be appreciated that it can be applied to many other networks.

Figure 2:
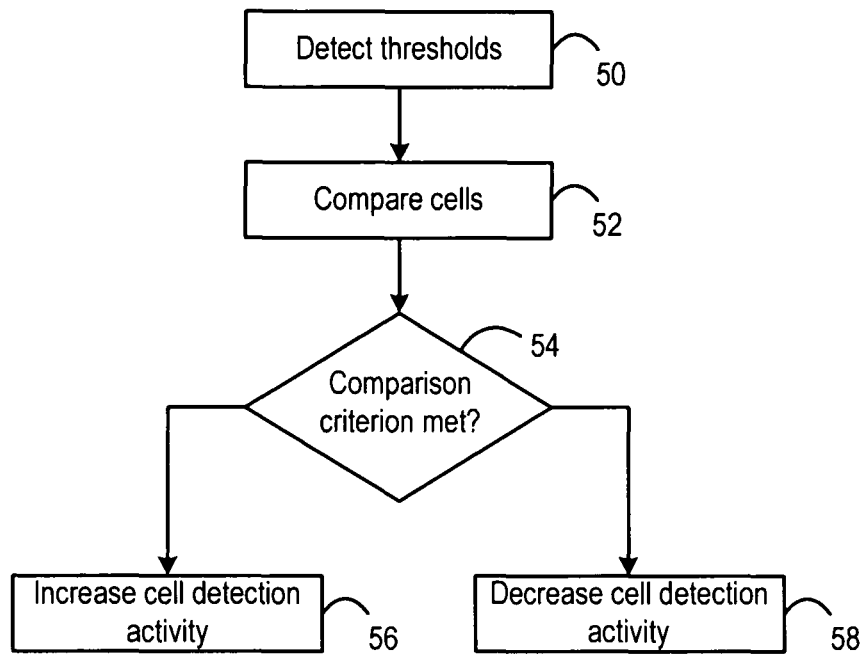
FIG. 2 is a flow chart, illustrating a first method in accordance with an aspect of the present invention.

FIG. 2 is a flow chart, illustrating a first method in accordance with the present invention.

In step 50, the UE detects the thresholds to be used in the method. In step 52, the UE makes a comparison between quality measurements that it has made on a reference cell, and quality measurements that it has made on a certain number of other already identified cells. If it is determined in step 54 that a comparison criterion is met, the process passes to step 56, and the cell detection activity or intensity level is increased, while, if it is determined in step 54 that a comparison criterion is not met, the process passes to step 58, and the cell detection activity or intensity level is decreased.

According to one embodiment of the invention, the cell detection activity or intensity of new cell is determined by the UE after comparing the quality level of the already identified cells with that of the serving cell. Thus, in one embodiment, the network signals at least one relative threshold that can be used by the UE to compare the cells in terms of downlink received levels such as Common pilot channel (CPICH) Ec/No and Synchronization channel (SCH) Ec/No. The threshold could also be a fixed value standardized in the specification.

The network can also signal a parameter, 'N', i.e. the number of strongest cells whose received levels has to be compared with that of the reference cell. The reference cell is the serving cell in the preferred embodiment. In another embodiment the comparison is to be done with the best cell. Like in case of threshold this number (N) can also be a standardized value.

The new cell detection activity is dependent upon whether the difference of the measured quantity between the serving and target cell (s) is larger or smaller than the relative threshold.

The low or coarse cell detection activity or intensity means that UE mainly detects a new cell during wake up times of the Discontinuous reception (DRX) or over considerably longer period compared to that required in continuous reception scenario.

High cell detection intensity means on the other hand that UE either identifies the cell continuously or assuming very short DRX cycle. This leads to similar cell detection performance (i.e. cell detection delay) which is achievable in continuous reception scenario.

There can also be intermediate cell detection intensity levels depending upon how many relative threshold levels are used as explained further below.

Criteria to Define Relative Thresholds: Cell Comparison Criterion

The relative threshold would employ which measurement quantity should be used by the UE to compare cells. In other words the relative threshold would determine the comparison criterion. As an example, the threshold could be expressed in one or more of the following parameters:

Neighbour cell measurement level, such as Received signal code power (RSCP) and/or Ec/No in WCDMA, or Reference symbol received power (RSRP) and/or Reference symbol received quality (RSRQ) in E-UTRAN.

SCH received level, for example SCH Signal to Interference and Noise Ratio (SINR), SCH Ec/No, BER or received signal strength.

Received signal level on any known pilot or reference symbol.

Cell identification delay history of the existing cells in active or candidate set In WCDMA one preferred relative threshold to decide the intensity of cell detection is to be expressed in terms of relative CPICH Ec/No and/or SCH Ec/No levels. This is because the cell identification requirements are specified for the given SCH and CPICH received levels.

Another possibility would be that the comparison is done according to one or more criteria cited above.

Furthermore the above relative thresholds could be single level or multi-level (M). In the former approach the network signals only one threshold per criterion. This would lead to two levels of cell detection activity level: normal or high and low. In the latter approach the network could signal several relative thresholds per criterion, which would require UE to achieve several cell detection activity levels (i.e. M+1 for M threshold). For simplicity reason the single level relative threshold is preferred and would also be adequate in most scenarios.

Network can also specify how often (i.e. periodicity of comparison) the UE has to compare the cells based on the relative thresholds. This could either be a signalled parameter or can be specified for instance in terms of number of frames or number of DRX cycles or some fixed durations.

Signaling Mechanism of Relative Thresholds and N Cells to be Compared:

The above thresholds and other related parameters (for example, the periodicity at which to compare the cells, and the number, N, of cells in the active or candidate set that are to be compared) can be signalled by state of the art method using radio resource control (RRC) or any higher layer signalling. The thresholds could be signalled via broadcast channel to all the UE or to specific UE via UE specific control channel. Furthermore different threshold values for the same criterion could be used in idle and active mode.

In WCDMA since RRC resides in the radio network controller (RNC), therefore the RNC will control the signalling of these thresholds. In E-UTRAN the thresholds are signalled by the base station (or eNode B in E-UTRAN terminology).

Reference Cell for Comparison

The UE new cell detection activity of a particular target cell will be based on the relative performance difference between target cell(s) and a reference cell. Broadly there are two possibilities:

Comparison with serving cell
Comparison with the best cell

In the embodiment where reference cell is the serving cell the UE always compares the target cells with the serving cell using one or more of the criteria outlined in the section relating to the criteria to define relative thresholds. Based on this comparison the UE will decide whether to detect a new cell with a high or a low intensity.

As an example assume both pilot signal quality (RSRQ in E-UTRAN or CPICH Ec/No in WCDMA) and SCH received level (e.g. SCH SINR in E-UTRAN or SCH Ec/No in WCDMA) are used to determine the new cell detection activity or intensity level.

Furthermore, consider only single level relative thresholds, i.e. α and β for RSRQ (or CPICH Ec/No) and SCH SINR (or SCH Ec/No) respectively.

Then UE will identify a new cell less frequently (resulting in coarse or longer cell identification delay) if one or both of these measured quantity difference between N best or strongest cells (i.e. in terms of SCH Ec/No and/or CPICH Ec/No in WCDMA) and serving cell S falls below the corresponding threshold. Thus:

IF $$(Q_N-Q_S \leq \alpha) \text{OPERATOR}(P_N-P_S \leq \beta)$$

THEN
  Identify a new cell with lower activity or with less intensity
ELSE
  Identify a new cell with higher or normal intensity
Where,
Q=RSRQ in E-UTRAN and CPICH Ec/No in WCDMA
P=SCH SINR in E-UTRAN and SCH Ec/No in WCDMA In one arrangement for both E-UTRAN and WCDMA, OPERATOR is set to AND. In an alternative arrangement for both E-UTRAN and WCDMA, OPERATOR is set to OR.

In another embodiment only one of the measurement quantities (Q or P) could be used in the above algorithm by the UE to decide the measurement activity level on the target cell.

In one embodiment $Q_N$ and $P_N$ stand for the respective signal levels received from the weakest of the N best neighbour cells in the active or candidate set. As mentioned above, the value of N can be signalled to the UE. Varying the value of N can change the overall detection activity. As an alternative, the value of N can be stored in the UE.

Similarly in another embodiment $Q_N$ and $P_N$ stand for the respective signal levels received from the weakest cell in the active or candidate set.

In the embodiment where the reference cell is the best cell the UE always compare the target or neighbour cells with the best cell, which may not always be the serving cell.

As before, the UE uses one or more of the criteria outlined in the section relating to criteria to define relative thresholds. Based on this comparison the UE will decide whether to detect a new cell with a high or a low intensity. This method may however not give sufficient information regarding the target cells, e.g. the strongest cell may have no resources left.

As an example assume both pilot signal quality (RSRQ in E-UTRAN or CPICH Ec/No in WCDMA) and SCH received level (e.g. SCH SINR in E-UTRAN or SCH Ec/No in WCDMA) are used to determine the new cell detection activity or intensity level. Furthermore, consider only single level relative thresholds, i.e. α and β for RSRQ (or CPICH Ec/No) and SCH SINR (or SCH Ec/No) respectively.

Then UE will identify a new cell less frequently (resulting in coarse or longer cell identification delay) if one or both of these measured quantity difference between N best or strongest cells (i.e. in terms of SCH Ec/No and/or CPICH Ec/No in WCDMA) and the best cell B falls below the corresponding threshold.

IF $$(Q_N-Q_B \leq \alpha) \text{OPERATOR}(P_N-P_B \leq \beta)$$

THEN
  Identify a new cell with lower activity or with less intensity
ELSE
  Identify a new cell with higher or normal intensity The symbols: Q, P and OPERATOR have the same meaning as described in the foregoing.

In one embodiment $Q_K$ and $P_K$ stand for the respective signal levels received from the weakest of the N best neighbour cells in the active or candidate set.

Similarly in another embodiment $Q_K$ and $P_K$ stand for the respective signal levels received from the weakest cell in the active or candidate set.

Figure 3:
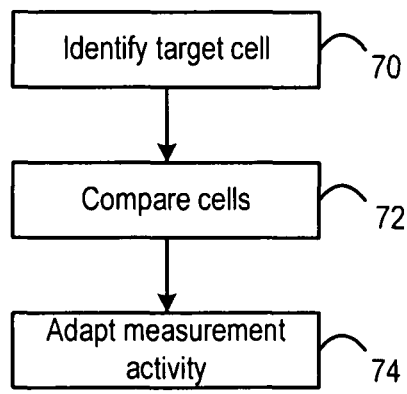

Combined Use of Relative Threshold Based Adaptive Cell Detection and Relative Threshold Based Measurement Activity FIG. 3 is a flow chart, illustrating a further method in accordance with the present invention.

In step 70, a target cell is identified. In step 72, a quality of that target cell is compared with a quality of a reference cell. Based on the result of that comparison, in step 74, the measurement activity on that target cell can be adapted.

Thus, the measurement activity or intensity level of an already identified target cell can be adapted based on relative threshold between the serving/best cell and that target cell.

It should be noted that firstly the relative threshold and other parameters used for the cell detection may not be the same. Secondly the idea of adaptive measurement activity based on relative threshold and the concept of adaptive cell detection activity based on relative threshold according to the present invention can very well work independently as well as together.

The invention will provide the following advantages:

In DRX mode the UE will search a new cell faster only when it is necessary that is when the active set or candidate set contains relatively weaker cells.

The network is able to keep track of all the required number of target cells without degrading the measurement performance.

The UE is still able to save its battery as much as possible while making full use of DRX.

Reasonably good cell change or handover performance can be maintained.

REFERENCES

[1] 3GPP TS 25.133, "Requirements for support of radio resource management (FDD)".
[2] 3GPP TS 36.801, "Evolved Universal Terrestrial Radio Access (E-UTRA); Measurement Requirements".
[3] 3GPP TS 25.215, "Physical layer measurements (FDD)".
[4] 3GPP TS 36.214, "Evolved Universal Terrestrial Radio Access (E UTRA); Physical layer measurements".
[5] 3GPP TS 25.214, "Physical layer procedures (FDD)".
[6] RP-070679, "Enhanced UE DRX for FDD", Nokia, Nokia Siemens Networks, Qualcomm, LG Electronics, Philips, NXP.

[7] 3GPP R4-071242, "Regarding Measurements During CPC Downlink DRX Operation, Marvell, RAN4#44 meeting.

The invention claimed is:

1. A method of detecting a new neighbor cell in a user equipment of a cellular telecommunication system, the method comprising:
comparing a quality level of already identified neighbor cells with a quality level of a serving cell; and
based on said comparison, setting a new intensity of cell detection activity;
wherein of comparing a quality level of already identified neighbor cells with a quality level of a serving cell comprises determining whether a downlink received signal quality from a selection of said already identified neighbor cells is weaker than the serving cell by a threshold; and
wherein the new cell detection activity is set to a first intensity if the downlink received signal quality from the selection of said already identified neighbor cells is not weaker than the serving cell by the threshold, and the new cell detection activity is set to a second intensity if the downlink received signal quality from the selection of said already identified neighbor cells is weaker than the serving cell by the threshold, and the second intensity is higher than the first intensity.

2. A method as claimed in claim 1, wherein the quality level is assessed on the basis of Received signal code power (RSCP).

3. A method as claimed in claim 1, wherein the quality level is assessed on the basis of CPICH Ec/No.

4. A method as claimed in claim 1, wherein the quality level is assessed on the basis of Reference symbol received power (RSRP).

5. A method as claimed in claim 1, wherein the quality level is assessed on the basis of Reference symbol received quality (RSRQ).

6. A method as claimed in claim 1, wherein the quality level is assessed on the basis of SCH Signal to Interference and Noise Ratio (SINR).

7. A method as claimed in claim 1, wherein the quality level is assessed on the basis of SCH Ec/No.

8. A method as claimed in claim 1, wherein the quality level is assessed on the basis of bit error rate.

9. A method as claimed in claim 1, wherein the quality level is assessed on the basis of received signal strength.

10. A method as claimed in claim 1, wherein the quality level is assessed on the basis of a combination of measurements.

11. A method as claimed in claim 1, wherein the threshold is received by the user equipment in signaling from the cellular communication system.

12. A method as claimed in claim 1, wherein the threshold is stored by the user equipment.

13. A method as claimed in claim 1, wherein of comparing a quality level of already identified neighbor cells with a quality level of a serving cell comprises comparing the quality level of one cell of said already identified neighbor cells with the quality level of the serving cell, said one cell being a cell having a lowest quality from a predetermined number of said already identified neighbor cells.

14. A method as claimed in claim 13, wherein the predetermined number is received by the user equipment in signaling from the cellular communication system.

15. A method as claimed in claim 13, wherein the predetermined number is stored by the user equipment.

16. A user equipment for use in a cellular telecommunication system, said the user equipment being adapted to detect a new neighbor cell by being configured to:
compare a quality level of already identified neighbor cells with a quality level of a serving cell; and
based on said comparison, set a new intensity of cell detection activity;
wherein to compare the quality level of already identified neighbor cells with the quality level of the serving cell, said user equipment is configured to determine whether a downlink received signal quality from a selection of said already identified neighbor cells is weaker than the serving cell by a threshold; and
wherein the new cell detection activity is set to a first intensity if the downlink received signal quality from the selection of said already identified neighbor cells is not weaker than the serving cell by the threshold, and the new cell detection activity is set to a second intensity if the downlink received signal quality from the selection of said already identified neighbor cells is weaker than the serving cell by the threshold, and the second intensity is higher than the first intensity.

17. A user equipment as claimed in claim 16, wherein the quality level is assessed on the basis of Received signal code power (RSCP).

18. A user equipment as claimed in claim 16, wherein the quality level is assessed on the basis of Ec/No.

19. A user equipment as claimed in claim 16, wherein the quality level is assessed on the basis of Reference symbol received power (RSRP).

20. A user equipment as claimed in claim 16, wherein the quality level is assessed on the basis of Reference symbol received quality (RSRQ).

21. A user equipment as claimed in claim 16, wherein the quality level is assessed on the basis of SCH Signal to Interference and Noise Ratio (SINR).

22. A user equipment as claimed in claim 16, wherein the quality level is assessed on the basis of SCH Ec/No.

23. A user equipment as claimed in claim 16, wherein the quality level is assessed on the basis of bit error rate.

24. A user equipment as claimed in claim 16, wherein the quality level is assessed on the basis of received signal strength.

25. A user equipment as claimed in claim 16, wherein the quality level is assessed on the basis of a combination of measurements.

26. A user equipment as claimed in claim 16, wherein the threshold is received by the user equipment in signaling from the cellular communication system.

27. A user equipment as claimed in claim 16, wherein the threshold is stored by the user equipment.

28. A user equipment as claimed in claim 16, wherein to perform said comparison, the user equipment is configured to compare the quality level of one cell of said already identified neighbor cells with the quality level of the serving cell, said one cell being a cell having a lowest quality from a predetermined number of said already identified neighbor cells.

29. A user equipment as claimed in claim 28, wherein the predetermined number is received by the user equipment in signaling from the cellular communication system.

30. A user equipment as claimed in claim 28, wherein the predetermined number is stored by the user equipment.

31. A network node, adapted to signal to a user equipment a relative threshold, for use in a comparison between a quality level of a reference cell and a quality level of an already identified neighbor cell and setting of a cell detection activity intensity based on said comparison;

wherein said comparison comprises determining whether a downlink received signal quality from a selection of said already identified neighbor cells is weaker than the serving cell by the threshold; and wherein the new cell detection activity is set to a first intensity if the downlink received signal quality from the selection of said already identified neighbor cells is not weaker than the serving cell by the threshold, and the new cell detection activity is set to a second intensity if the downlink received signal quality from the selection of said already identified neighbor cells is weaker than the serving cell by the threshold, and the second intensity is higher than the first intensity.

32. A network node as claimed in claim 31, wherein the network node is further adapted to signal to a user equipment a number of already identified neighbor cells, for use in said comparison.

\* \* \* \* \*